United States Patent
Negulescu et al.

(10) Patent No.: US 9,540,094 B2
(45) Date of Patent: Jan. 10, 2017

(54) PROPELLER FOR AN AIRCRAFT ENGINE COMPRISING MEANS FOR REDUCING NOISE AT MIDDLE AND HIGH FREQUENCIES AND IMPROVING THE ACOUSTIC PERCEPTION

(71) Applicant: Airbus Operations (SAS), Toulouse (FR)

(72) Inventors: Camil Negulescu, Toulouse (FR); Magdi Omais, Hamburg (DE)

(73) Assignee: AIBUS OPERATIONS (SAS), Toulouse (FR)

( * ) Notice: Subject to any disclaimer, the term of this patent is extended or adjusted under 35 U.S.C. 154(b) by 972 days.

(21) Appl. No.: 13/894,076

(22) Filed: May 14, 2013

(65) Prior Publication Data

US 2014/0064968 A1    Mar. 6, 2014

(30) Foreign Application Priority Data

May 16, 2012   (FR) ...................................... 12 54490

(51) Int. Cl.
*B64C 11/18*    (2006.01)
*B64C 11/48*    (2006.01)
*B64D 27/00*    (2006.01)

(52) U.S. Cl.
CPC ............... *B64C 11/48* (2013.01); *B64C 11/18* (2013.01); *B64D 2027/005* (2013.01); *Y02T 50/66* (2013.01)

(58) Field of Classification Search
CPC ........ B64C 11/008; B64C 11/10; B64C 11/16; B64C 11/18; B64C 11/46; B64C 11/48; B64C 11/50; B64D 2027/005; Y02T 50/66

See application file for complete search history.

(56) References Cited

U.S. PATENT DOCUMENTS

| | | | |
|---|---|---|---|
| 3,536,417 A | | 10/1970 | Stiefel et al. |
| 4,784,575 A | * | 11/1988 | Nelson .................... B64C 11/18 416/144 |
| 5,306,119 A | | 4/1994 | Bandoh et al. |
| 5,667,361 A | * | 9/1997 | Yaeger ..................... F01D 5/22 416/193 R |
| 5,966,525 A | | 10/1999 | Manzi, Jr. et al. |
| 2004/0197187 A1 | | 10/2004 | Usab, Jr. et al. |
| 2011/0277447 A1 | | 11/2011 | Stuermer |

FOREIGN PATENT DOCUMENTS

EP    0870903    10/1998

OTHER PUBLICATIONS

French Search Report, Feb. 8, 2013.

* cited by examiner

*Primary Examiner* — Dwayne J White
*Assistant Examiner* — Adam W Brown
(74) *Attorney, Agent, or Firm* — Greer, Burns & Crain, Ltd.

(57) ABSTRACT

Enriching and balancing the acoustic spectrum radiated by a propeller by introducing a differential pitch angle on certain blades of the propeller. Modifying the acoustic spectrum makes it possible to render the propeller noise more pleasant to the human ear.

12 Claims, 4 Drawing Sheets

PROPELLER FOR AN AIRCRAFT ENGINE COMPRISING MEANS FOR REDUCING NOISE AT MIDDLE AND HIGH FREQUENCIES AND IMPROVING THE ACOUSTIC PERCEPTION

CROSS-REFERENCES TO RELATED APPLICATIONS

This application claims the benefit of the French patent application No. 12 54490 filed on May 16, 2012, the entire disclosures of which are incorporated herein by way of reference.

TECHNICAL FIELD

This invention relates in general to the reduction of propeller noises of aircraft.

BACKGROUND OF THE INVENTION

Reducing the noise of aircraft has represented for a few years now a substantial socio-economic challenge. Indeed, air traffic is constantly growing, whether in terms of the number of flights or by the size of the aircraft. This growth is however up against the harmonious integration of commercial aviation activity into the environment due to the noise pollution generated by the aircraft.

As such, the high sound levels emitted by the aircraft in take-off and approach phase are particularly inconveniencing for the citizens living close to airports and the authorities therefore are forcing aircraft manufacturers to reduce these noises.

On the other hand, the requirements of the passengers in terms of comfort are increasing, and the reduction of the engine noises in the cabin is a substantial factor in terms of improving this comfort.

Consequently, reducing acoustic emissions of aircraft is one of the priorities of aircraft manufacturers.

Reducing the noise of aircraft is however a scientific and technical challenge as the notion of noise entails complex phenomena which are still poorly known, such as psycho-acoustics which relates to the perception of noises by the human ear.

Noise is defined as any unpleasant and inconveniencing auditory sensation and any acoustic phenomenon producing this sensation.

The studies carried out in psycho-acoustics show that the sensation of the discomfort caused by a noise depends primarily on its purity, its intensity and its frequency.

The human auditory system is sensitive to frequencies ranging from 20 Hz to a maximum of about 20,000 Hz. However, it is known that the human ear does not have the same sensitivity for all of the audible frequencies and as such the relation between the perception of a pure noise and the intensity of this noise is not linear.

FIG. 1 shows as such isosonic curves of the human ear according to the standard ISO226:2003. These curves show a measurement of the sound pressure (in decibels A), according to the frequency, that a person perceives as a sound of the same level.

With regards to FIG. 1, it is observed that the human ear is less sensitive to the low frequencies. Consequently, the human brain accepts more easily, for the same amount of power, a low-frequency audible signal than a high- or medium-frequency audible signal. By way of example, a sound of 50 dB(A) and with a frequency of 1000 Hz produces an auditory sensation that is stronger than a sound of 50 dB(A) with a frequency of 100 Hz. Note in addition that the human ear is particularly sensitive to frequencies between 1000 Hz and 3000 Hz.

On the other hand, the human brain accepts more easily an audible signal emitted over a wide band of frequencies than pure or tonal noise. Indeed, studies carried out on many subjects show that the human ear perceives a sound as pleasant if the latter is comprised of a high number of frequencies.

Reducing the noise of an aircraft requires taking its motorisation into account: turboprop or turbojet.

In a turbojet, the various vaned wheels, such as the fan and the vaned wheels of the compressor or compressors, are ducted.

Many studies have been conducted in order to decrease the noises due to turbojet aircraft, which represent the majority of the world fleet. The noises emitted by the rotors of turbojets are particularly inconveniencing as their fundamental frequency is of a few thousand Hertz (of a magnitude of 1000-2000 Hz), frequencies to which the human ear is particularly sensible, as shown in FIG. 1.

As such, U.S. Pat. No. 5,966,525 relates to the acoustic radiation of a turbojet induced by geometrical imprecisions of the assembly of the vanes of its rotors. This additional source of noise is known under the name of Buzz Saw Noise (BSN).

Due to the fairing of the rotor, certain harmonics are propagated outside of the air duct wherein this rotor moves, while others are evanescent. The method described in this patent then consists in displacing the energy of the acoustic spectrum of the turbojet, and more particularly of its BSN component, in order to concentrate it in the non-propagative portion of the acoustic spectrum. For this purpose, the vanes of the rotor, having slight geometrical variations between them, are distributed regularly around the axis of the rotor and in a sinusoidal manner with a high period in order to concentrate the energy on harmonics of a low degree with an evanescent nature.

This technique, although it is effective, is however complex since it requires manufacturing different vanes, with slight geometrical variations.

The noise reduction techniques applied to turbojets cannot be applied to turboprops.

Indeed, the propeller of a turboprop is not ducted and as such all of the frequencies in the spectrum of its audible signal are transmitted. The same applies in the case of turbomachines with a couple of unducted contrarotating propellers, also referred to as "open rotor".

In addition, the rotating speeds of a propeller of a turboprop or of an "open rotor" are substantially less than those of a rotor of the vaned wheels of a turbojet. Indeed, the fundamental frequency of the acoustic spectrum radiated by a propeller of this type is of a few hundred Hertz in such a way that the techniques that can reduce the noise of it are very different.

The fundamental frequency of the acoustic spectrum radiated by a propeller is easily calculated. In the case of a conventional propeller with n blades rotating at a rotating speed R (rpm), the propeller returns to an initial state for a rotation of 1/n revolutions. The period of the acoustic phenomenon is given by:

$$T1 = \left(\frac{60}{R}\right) \cdot (1/n) \tag{1}$$

and the frequency of the acoustic phenomenon is:

$$f1 = 1/T_1 = (R \cdot n)/60 \quad (2)$$

In particular, the fundamental frequency of acoustic radiation of a propeller with 6 blades is f=RPM/10 since the propeller returns to its initial state every 1/6 revolutions.

The traction of a propeller is a determining parameter on the level of noise in db(A) that it radiates. Indeed, an increase of the traction is equivalent to an increase in the load of the propeller inducing a noise referred to as "load" or dipolar noise.

The increase of the traction in transonic configuration also induces an increase in the intensity of the shocks on the blade, and therefore of the shock noise referred to as "quadrupole".

FIG. 2 shows a diagrammatical representation of the forces being exerted on an aerofoil of a propeller blade of an aircraft.

The traction vector T of the blade 1, directed according to the direction of the flight of the aircraft, is given by the projection of the total force Ft on the engine axis X, or axis of rotation of the propeller. The blade 1, of which the aerofoil is similar to that of an aircraft wing, has indeed a relative velocity W and is subjected to a lift force Fz, perpendicular to its relative velocity vector W and a drag force Fx, collinear to its relative velocity vector W.

The traction T delivered by a blade of a propeller is in particular linked to the pitch angle β of the blades by the intermediary of the angle of incidence α and of the angle φ that the relative velocity vector W of the aerofoil forms with the plane of rotation of the propeller Y. Indeed, the angles β, α and φ are linked by the following relationship:

$$\beta = \alpha + \phi \quad (3)$$

Pitch angle means the angle between the chord of an aerofoil of a blade of the propeller and a plane perpendicular to the axis of rotation of the propeller. The chord is defined as the segment connecting the leading edge with the trailing edge of the blade.

A propeller blade comprises a blade root by means of which the blade is fixed on the hub of the propeller, as well as an aerodynamic portion extending radially towards the exterior in relation to the axis of rotation of the propeller from the root of the blade. The aerodynamic portion comprises a plurality of aerofoils between its radially inner end, referred to as base of the blade and located nearby the root of the blade, and its radially outer end, referred to as blade tip.

In this description, the aerofoil chosen to define the pitch angle is the aerofoil of the base of the blade.

The pitch angle of the set of blades of a propeller can be modified during the flight, in a controlled manner or automatically, in order to modify the traction supplied by the propeller.

Certain tests have been carried out in order to reduce the noise of an aft rotor of a helicopter. One solution tested consists in designing a rotor wherein the distribution of the blades around the axis of rotation is not regular, in order to reduce the interaction noise of the rotor with its supports. However, such a system is relatively complex and fragile and cannot be applied to a turbomachine propeller without considerably increasing the mass and the maintenance costs of the latter. This type of solution is therefore not optimal in the framework of a large-scale commercial operation.

SUMMARY OF THE INVENTION

One of the objectives of the invention aims to design an aircraft propeller of which the noise is pleasant to the human ear when the latter is rotating and which the design is simple to implement.

This objective is achieved by a propeller for a turbomachine of an aircraft, comprising a hub in rotation according to an axis of rotation of the propeller and at least 4 blades distributed around said hub, with each of the blades comprising a blade root with which the blade is fixed on said hub of the propeller and an aerodynamic portion extending radially towards the exterior in relation to the axis of rotation of the propeller from the root of the blade, with a pitch angle defined for each blade as the angle that a chord of an aerofoil of the radially inner end of the aerodynamic portion of the blade forms with a plane perpendicular to the axis of rotation of the propeller, characterised in that the blades of at least one first set of blades uniformly distributed around said hub have a pitch angle that differs from that of a second set of blades uniformly distributed around said hub.

More preferably, the blades of the propeller are distributed uniformly around said hub of the propeller.

In a preferred embodiment of the invention, the propeller comprises n blades, with n non-prime.

According to the invention, the maximum difference in pitch angle between any two blades of the propeller is less than or equal to 5°.

The propeller according to the invention can include a third set of blades having a pitch angle that differs from that of the first set of blades and from that of the second set of blades.

The invention further relates to a turbomachine for aircraft comprising at least one propeller according to the invention.

The invention further relates to a turbomachine for aircraft comprising two propellers according to the invention, with the two propellers being coaxial and placed behind one another along an axis of said machine, said propellers rotating in the respective opposite directions.

BRIEF DESCRIPTION OF THE DRAWINGS

Other characteristics and advantages of the invention shall appear when reading the preferred embodiment of the invention given by way of a non-restricted example in reference to the annexed figures wherein.

DETAILED DESCRIPTION OF THE PREFERRED EMBODIMENTS

Figure 1:
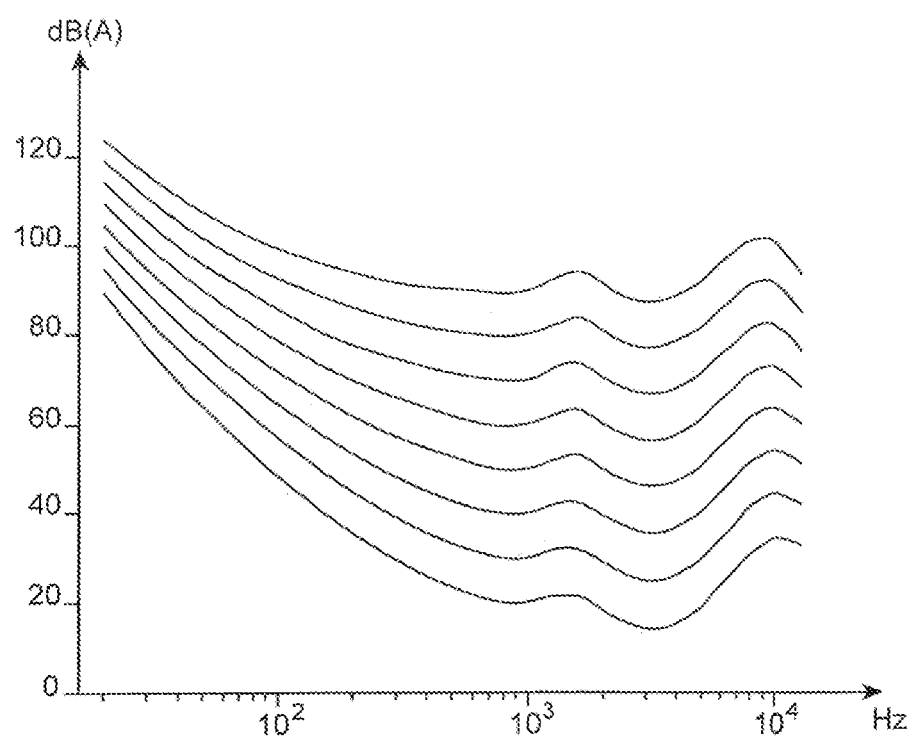
FIG. 1, already described, shows isosonic curves of the human ear.
Figure 2:
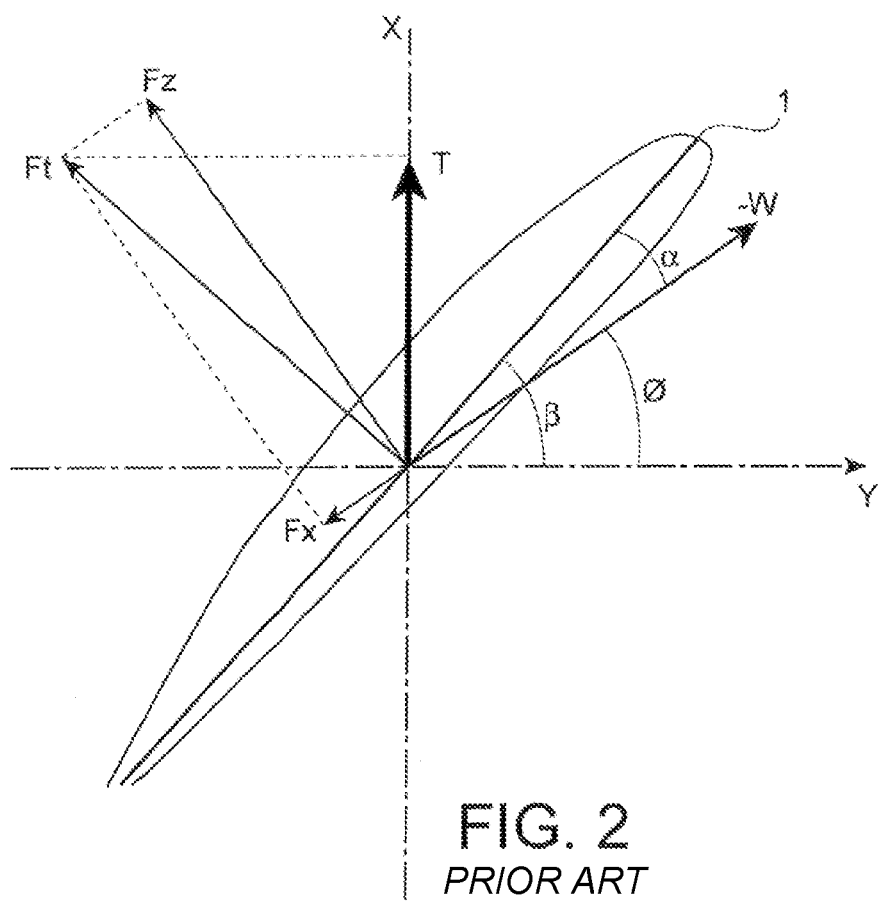
FIG. 2, already described, shows a diagrammatical representation of the forces being exerted on an aerofoil of a propeller blade of a turbomachine of an aircraft.

The idea at the base of the invention is to introduce a differential pitch on certain blades of a propeller. The invention aims primarily an application for propellers of turbomachines for aircraft, such as turboprops and turbomachines with unducted contrarotating propellers.

More precisely, the invention relates to a propeller for the turbomachine of an aircraft comprising a hub in rotation according to the axis of rotation of the propeller and at least 4 blades distributed around said hub, where the blades of at least one first set of blades uniformly distributed around the hub have a pitch angle that differs from that of a second set of blades uniformly distributed around the hub.

As was previously shown, each of the blades comprises a blade root by means of which the blade is fixed on the hub of the propeller and an aerodynamic portion extending radially towards the exterior in relation to the axis of rotation of the propeller from the root of the blade. The pitch angle is defined for each blade as being the angle that a chord of an aerofoil of the radially inner end of the aerodynamic portion of the blade forms with a plane perpendicular to the axis of rotation of the propeller.

The difference in pitch angle between two blades is obtained via a rotation of any blade around its axis.

More preferably, all of the blades of the propeller are uniformly distributed around the axis of the propeller in such a way as to not introduce imbalances of the out-of-balance type on the shaft of the propeller which would require setting up systems for rebalancing the propeller.

In this case, the propeller comprises more preferably n blades, with n non-prime. As such, the invention relates to for example a propeller comprising 4, 6, 8, 9, 10 or 12 blades.

Likewise, in order to avoid the setting up of systems for rebalancing the propeller and to prevent a possible premature wear and tear of the parts of the turbomachine, in particular of the drive mechanism of the propeller and of its axis, the blades of the propeller are advantageously identical. By identical is meant that all of the aerodynamic portions of the blades of the propeller have the same shape, the same weight and are made from the same material.

In this way, machining a propeller according to the invention does not require complex steps in relation to machining a propeller of the state of the art.

The propeller according to the invention can also be obtained by retrofitting with a variable pitch propeller of a known type. In this case, the variable pitch mechanism can be modified in order to introduce the difference in pitch angle of certain blades of the propeller.

The difference in pitch angle, implemented in a propeller according to the invention, combined with the uniform distribution of the blades of the same set around the hub, makes it possible to rupture the uniformity of the acoustic sources and therefore to distribute the energy of the audible signal emitted by the propeller over a plurality of lines of the acoustic spectrum radiated by the propeller, according to the desired configuration.

The difference in pitch angle is advantageously as large as possible in order to obtain a substantial distribution of the energy of the audible signal. However, the choice of the pitch angle is limited by the necessity to retain good aerodynamic performance of the propeller. Indeed, an excessive pitch angle moves the aerofoils of the blades away from their optimum aerodynamic operating point.

Consequently, the maximum difference in pitch angle between any two blades of the propeller is advantageously less than or equal to 5°. The optimum pitch angles, which make it possible to obtain the best signal-to-noise ratio for the propeller, can be determined by computer simulation or by wind tunnel tests, taking into account the number of blades of the propeller and the aerofoil of these blades.

Figure 3:
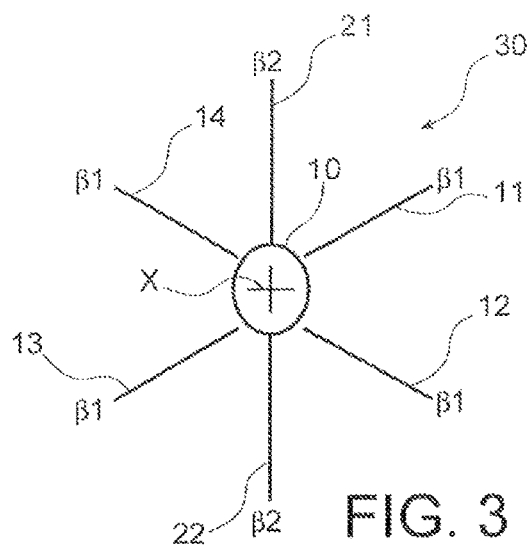
FIG. 3 shows a first embodiment of a six-bladed propeller according to the invention.
Figure 4:
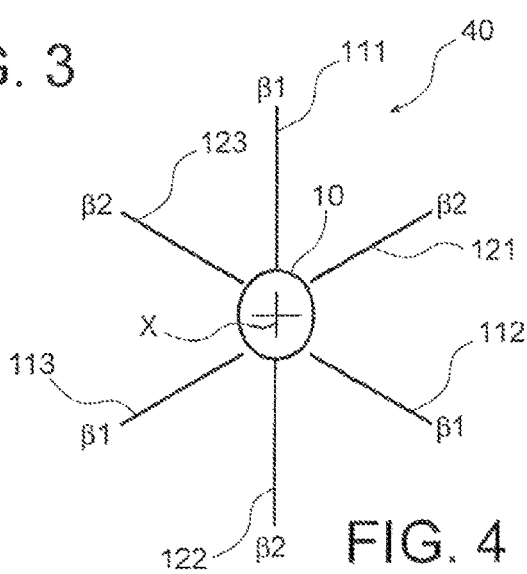
FIG. 4 shows a second embodiment of a six-bladed propeller according to the invention.
Figure 5:
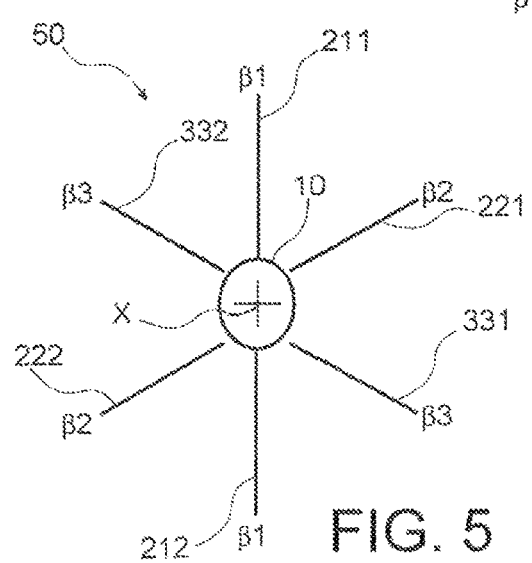
FIG. 5 shows a third embodiment of a six-bladed propeller according to the invention.

The modification of the acoustic spectrum radiated by the propeller, introduced by the difference in pitch angle implemented according to the invention shall now be explained in more detail with FIGS. 3, 4 and 5. In these figures, the propellers 30, 40 and 50 are shown, each having six identical blades, regularly distributed around the axis of rotation X of the propeller. The aerodynamic portion of the blades of propellers 30, 40 and 50 is shown very diagrammatically by a line starting from the hub 10 of the propeller. The choice of illustrating this preferred embodiment of the invention makes it possible to explain more simply the way in which the distribution of the energy of the audible signal operates.

FIG. 3 shows a first embodiment of a propeller 30 of a turboprop according to the invention, wherein the propeller 30 has six identical blades, regularly distributed around the axis of rotation X of the propeller 30.

The blades 11, 12, 13, 14 have a first pitch angle $\beta 1$ while the blades 21 and 22 have a second pitch angle $\beta 2$ that differs from $\beta 1$. A differential pitch $\beta 2 - \beta 1$ is as such introduced on the blades 21 and 22. It is obtained by an angle rotation $\beta 2 - \beta 1$ of the entire blade 21, as well as of all of blade 22, around their axes. Note that the angle blades $\beta 2$ form a set of identical blades uniformly distributed around the axis of rotation X of the propeller 30.

The energy spectrum of the audible signal emitted by such a propeller 30 has two fundamental frequencies.

Indeed, for the blades 21 and 22, the propeller returns to its initial state every 1/2 revolutions while for the other blades, the propeller returns to its initial state every 1/6 revolutions.

The fundamental frequencies are therefore f1=RPM/10 Hz and f2=RPM/30 Hz.

It is understood that the variation in the pitch of the blades is of the pulse type, as a differential pitch from one blade to the other was introduced. As such, the variation in pitch of the blades generates a high number of harmonics. Harmonics of the fundamental frequency f2 also enrich the spectrum of the propeller 30.

The frequency f1 also has many harmonics, in particular a harmonic of frequency 2f1 having a high level, since the propeller also returns to its initial state every 2/6 revolutions in the case of blades 11, 12, 13, 14.

The energy of the acoustic signal radiated by the propeller is distributed between the harmonics, and the level of the fundamental f1 is diminished in relation to the level of the fundamental f1 of a propeller with 6 blades of prior art.

Consequently, the perception that the human ear has of the audible signal emitted by the propeller according to the invention is more pleasant than in the case of a propeller of prior art having the same number of blades. Indeed, the noise of the propeller according to the invention is of a wideband nature and the sound level of the fundamental frequencies is diminished.

According to the invention, different configurations of the propeller can be implemented in order to further decrease the energy of the fundamentals or to better distribute the energy of the acoustic signal over different lines of the acoustic spectrum.

As such FIG. 4 shows a second embodiment of a propeller 40 according to the invention, wherein the propeller has six identical blades, uniformly distributed around the axis of rotation X of the propeller 40.

The blades 111, 112, 113 have a first pitch angle $\beta 1$ while the blades 121, 122, 123 have a second pitch angle $\beta 2$ that differs from $\beta 1$.

FIG. 5 shows a third embodiment of a propeller 50 according to the invention, wherein the propeller has six identical blades, uniformly distributed around the axis of rotation X of the propeller 50.

In the configuration of FIG. 5, the propeller comprises three sets of blades each having a pitch angle that differs from the others.

The blades 211 and 212 have a first pitch angle β1 while the blades 221 and 222 have a second pitch angle β2 that differs from β1, and the blades 331 and 332 have a third pitch angle β3 that differs from β1 and from β2.

The invention has advantageously application in the field of turbomachines with contrarotating propellers, still called "open rotor".

The contrarotating propellers are coaxial and are driven by the same turbine. They are separated by a small axial distance over the same axis of rotation.

In the case of two contrarotating propellers, the propeller that receives the flow of air first is called the upstream propeller, the other propeller is called the downstream propeller.

The advantages of this type of turbomachines are well known. This type of configuration is in particular advantageous in terms of yield as it makes it possible to recover an additional source of thrust by adjusting the rotation induced on the air by the upstream propeller.

The configurations used in turbomachines with two contrarotating propellers from prior art are many, and the upstream or downstream propellers generally comprise a number of blades in the neighbourhood of ten. The upstream or downstream propellers can have a number of blades that is identical or different.

A turbomachine with contrarotating propellers is for example described in U.S. patent application 2010/0047068 wherein the upstream propeller comprises 12 blades while the downstream propeller comprises 10 blades.

For such turbomachines, a substantial source of noise results from the interaction between the wakes of the upstream propeller and the downstream propeller. Indeed, a significant portion of the acoustic emission of a contrarotating system results from the noise of the lines due to the impact of the wakes of the upstream propeller on the downstream propeller.

The analyse shows that the noise of the lines of interaction comprises all of the frequencies:

$$mB1\Omega_1 + kB2\Omega_2 \quad (4)$$

with m and k the indexes of the noise mode, $\Omega_1$ and $\Omega_2$ the speeds of the upstream and downstream propellers respectively, and B1 and B2 the numbers of the blades of the upstream and downstream propellers respectively.

Figure 7:
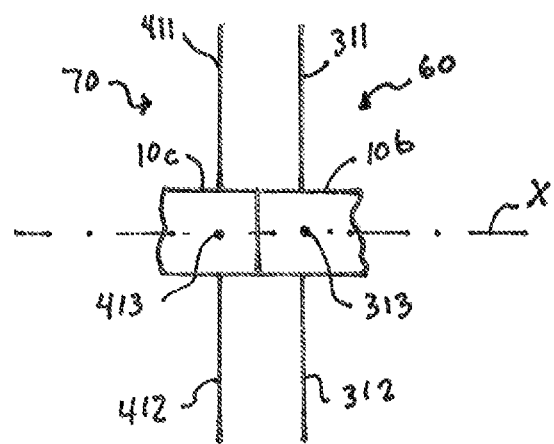
FIG. 7 shows a schematic side view of two coaxial contrarotating propellers.

According to the invention, a turbomachine with contrarotating propellers is proposed, and shown in FIG. 7, comprising a couple of coaxial contrarotating propellers 60, 70, each propeller comprising a hub 10b, 10c in rotation according to the axis of rotation X of the propeller and at least 4 blades 311, 312, 313 and 411, 412, 413 (fourth blade not visible) distributed around said hub, where the blades of at least one first set of blades uniformly distributed around the hub have a pitch angle that differs from that of a second set of blades uniformly distributed around the hub.

For a number of blades of the upstream propeller 60 or of the downstream propeller 70, for example in the neighbourhood of 10, it is possible, by introducing a suitable differential pitch, to multiply by 3 the number of lines generated by each propeller and therefore by 9 the number of lines of interaction according to the formula 4 hereinabove.

The acoustic spectrum radiated by the contrarotating propellers is then densified and the acoustic perception that the human ear has of the propeller noise is improved.

Figure 6:
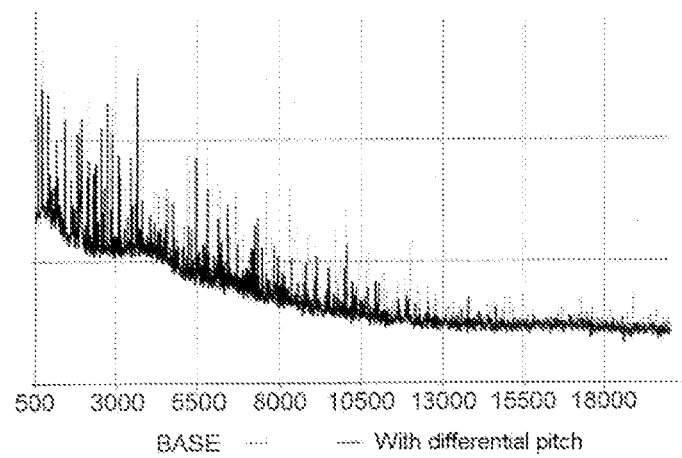
FIG. 6 shows a comparison of the noise spectra of a turbomachine with contrarotating propellers according to prior art and of a turbomachine with contrarotating propellers comprising propellers according to the invention.

FIG. 6 shows the respective radiated acoustic spectra of a turbomachine with contrarotating propellers of a known type (dotted line) and of a turbomachine with contrarotating propellers according to an embodiment of the invention (solid line), operating at full speed, in near field measured in the central plane of the upstream propeller. The various spectra were measured during wind tunnel tests.

The two propellers of each of these turbomachines comprise, in this example and in a non-restricted manner, an identical number of blades and equal to 9.

The propellers of the turbomachine of the known type do not have any variation in pitch angle, while the propellers of the turbomachine according to the invention have a differential pitch.

Each propeller of the turbomachine according to the invention comprises 2 sets of three blades and six blades respectively, uniformly distributed around the axis of rotation of the propeller, with the blades of each of the set having a pitch angle that differs from that of the blades of another set.

The tests carried out show that the invention applied to a turbomachine with contrarotating propellers allows for a reduction in noise in the medium and high frequencies, of nearly 5 dB per frequency.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A turbomachine for aircraft, comprising two propellers, said propellers being coaxial and arranged one behind the other along an axis of said turbomachine, and said propellers rotating in respective opposite directions, each of said propellers comprising a hub in rotation according to an axis of rotation of the propeller and at least 4 blades distributed around said hub, with each of the blades comprising a blade root by means of which the blade is fixed on said hub of the propeller and an aerodynamic portion extending radially outwardly away from the axis of rotation of the propeller from the root of the blade, with a pitch angle defined for each blade as being the angle that a chord of an aerofoil of the radially inner end of the aerodynamic portion of the blade forms with a plane perpendicular to the axis of rotation of the propeller, wherein in each of said propellers the at least 4 blades comprises a first plurality of blades and a second plurality of blade, each blade in the first plurality of said at least 4 blades uniformly distributed around said hub has a first pitch angle that differs from a second pitch angle of each blade in the second plurality of said at least 4 blades uniformly distributed around said hub wherein adjacent blades of said at least 4 blades are free from engagement along respective aerodynamic portions of said adjacent blades.

2. The turbomachine according to claim 1, wherein all of the blades of each of said propellers are distributed uniformly around said hub of the propeller.

3. The turbomachine according to claim 2, wherein each of said propellers comprises a quantity of blades designated by a variable n, wherein n is a non-prime number.

4. The turbomachine according to claim 3, wherein the maximum difference in pitch angle between any two blades each of said propellers is less than or equal to 5°.

5. The turbomachine according to claim 4, wherein the at least 4 blades of at least one of the propellers comprises at least 6 blades wherein each blade in a third plurality of said at least 6 blades has a third pitch angle that differs from the first pitch angle and the second pitch angle.

6. The turbomachine according to claim 3, wherein the at least 4 blades of at least one of the propellers comprises at least 6 blades wherein each blade in a third plurality of said at least 6 blades has a third pitch angle that differs from the first pitch angle and the second pitch angle.

7. The turbomachine according to claim 2, wherein the maximum difference in pitch angle between any two blades each of said propellers is less than or equal to 5°.

8. The turbomachine according to claim 7, wherein the at least 4 blades of at least one of the propellers comprises at least 6 blades w wherein each blade in a third plurality of said at least 6 blades has a third pitch angle that differs from the first pitch angle and the second pitch angle.

9. The turbomachine according to claim 2, wherein the at least 4 blades of at least one of the propellers comprises at least 6 blades wherein each blade in a third plurality of said at least 6 blades has a third pitch angle that differs from the first pitch angle and the second pitch angle.

10. The turbomachine according to claim 1, wherein the maximum difference in pitch angle between any two blades each of said propellers is less than or equal to 5°.

11. The turbomachine according to claim 10, wherein the at least 4 blades of at least one of the propellers comprises at least 6 blades wherein each blade in a third plurality of said at least 6 blades has a third pitch angle that differs from the first pitch angle and the second pitch angle.

12. The turbomachine according to claim 1, wherein the at least 4 blades of at least one of the propellers comprises at least 6 blades wherein each blade in a third plurality of said at least 6 blades has a third pitch angle that differs from the first pitch angle and the second pitch angle.

* * * * *